Patented Feb. 21, 1933

1,898,506

UNITED STATES PATENT OFFICE

HEINRICH SPECKETER, OF FRANKFORT-ON-THE-MAIN-GRIESHEIM, AND JULIUS SÖLL, OF FRANKFORT-ON-THE-MAIN-SCHWANHEIM, GERMANY, ASSIGNORS TO I. G. FARBENINDUSTRIE AKTIENGESELLSCHAFT, OF FRANKFORT-ON-THE-MAIN, GERMANY

PROCESS FOR PRODUCING DOUBLE COMPOUNDS OF ALUMINUM FLUORIDE-ALKALI-FLUORIDE

No Drawing. Application filed July 7, 1931, Serial No. 549,292, and in Germany July 29, 1930.

The present invention relates to a process for producing double compounds of aluminum fluoride-alkali metal fluoride.

Double compounds of aluminum fluoride-alkali metal fluoride particularly cryolite are ordinarily prepared by causing alumina compounds, hydrofluoric acid and soda or similar alkali metal salts to react with one another.

We have now found that in the process of preparing said double compounds of aluminum fluoride-alkali metal fluoride the soda or similar alkali metal compounds can be totally or partially replaced by the salts of chromic acid, such as alkali monochromate or alkali metal bichromate. If, for instance, sodium chromate is used for the preparation of the double compound in question, said sodium chromate is converted into chromic acid or sodium bichromate according to the quantity of the chromium salt which has been added. The process of converting chromates, for instance, by aluminum sulfate, may be explained by the following equations:

(1) $Al_2(SO_4)_3 + 3Na_2CrO_4 + 12HF =$
$Al_2F_{12}Na_6 + 3H_2CrO_4 + 3H_2SO_4$ or (2) $Al_2(SO_4)_3 + 12Na_2CrO_4 + 12HF =$
$Al_2F_{12}Na_6 + 6Na_2Cr_2O_7 + 3Na_2SO_4 + 6H_2O$ or (3) $Al_2(SO_4)_3 + 3Na_2Cr_2O_7 + 12HF + 3H_2O =$
$Al_2F_{12}Na_6 + 6H_2CrO_4 + 3H_2SO_4$.

Instead of aluminum sulfate, any other aluminum salt may likewise be used, for instance aluminum chloride, aluminum fluoride, or the like. If it is intended to transform hydrate of alumina for example into cryolite, the hydrate of alumina is dissolved either in hydrofluoric acid or in a solution containing chromic acid or another suitable acid which is produced during the precipitation of the double compound (for instance sulfuric acid).

It is advantageous to precipitate the double compound by taking care, that when the reagents are introduced into the reaction vessel, the ions fluorine, alkali metal and aluminum are present in as low a concentration as possible. The process may, for instance, be carried out as follows: the solution of cromate, the hydrofluoric acid and the solution of the aluminum salt are simultaneously introduced in equivalent proportions into a residual part of a finished batch, or into the filtrate thereof, or into water. The products thus obtained can easily be filtered. The precipitated double compound is not contaminated by chromate or bichromate. It may be seen from the equations given above that the sulfuric acid hitherto required for preparing bichromate by acidifying the chromate can be dispensed with, because the hydrofluoric acid which has been added acts in the same way as the sulfuric acid. The process may, of course, also be carried out in such a manner that any salts other than a chromate for instance sodium sulfate may simultaneously be present during the reaction. When the double compound is precipitated, the acid in question, for instance sulfuric acid, is likewise liberated. The acid bound to alumina and, if desired, the acid bound to alkali metal are replaced during the reaction by fluorine; they are in the filtrate of the precipitated double compound. They may be used for acidifying chromate solutions or for any other purpose.

The following example serves to illustrate the invention, but it is not intended to limit it thereto. The parts are by weight:

10.4 parts of $Al_2O_3$ in form of hydrate of alumina are dissolved in 40 parts of hydrofluoric acid of 30 per cent strength and simultaneously introduced, while stirring, into 2000 parts of water, or of a residual part of a former operation, together with 104 parts of a solution of sodium monochromate and 40 parts of hydrofluoric acid (of 30 per cent strength). The hydrate of alumina may likewise be dissolved in a sufficient quantity of the filtrate of a preceding operation containing the hydrofluoric acid, or it may be introduced in substance into the batch. Instead of the solution of aluminum fluoride there may be used the suspension of a corresponding quantity of the difficultly soluble modification of the aluminum fluoride.

We claim:

1. A process for producing double compounds of aluminum fluoride-alkali metal fluoride which comprises causing alkali metal chromates to act upon aluminum compounds and hydrofluoric acid.

2. A process for producing double compounds of aluminum fluoride-alkali metal fluoride which comprises causing an aqueous solution of alkali metal chromates to act simultaneously upon an aqueous solution of an aluminum compound and hydrofluoric acid.

3. A process for producing double compounds of aluminum fluoride-alkali metal fluoride which comprises causing an aqueous solution of alkali metal chromates to act simultaneously upon a solution of an aluminum compound of the group consisting of aluminum sulfate, aluminum chloride, aluminum fluoride and hydrate of alumina and hydrofluoric acid.

4. A process for producing double compounds of aluminum fluoride-alkali metal fluoride which comprises dissolving hydrate of alumina in aqueous hydrofluoric acid and causing this solution to act simultaneously upon an aqueous solution of sodium chromate and hydrofluoric acid.

In testimony whereof, we affix our signatures.

HEINRICH SPECKETER.
JULIUS SÖLL.